United States Patent
Naito

(10) Patent No.: US 9,208,383 B2
(45) Date of Patent: Dec. 8, 2015

(54) COMMODITY RECOGNITION APPARATUS AND METHOD FOR RECOGNIZING COMMODITY BY THE SAME

(71) Applicant: TOSHIBA TEC KABUSHIKI KAISHA, Shinagawa-ku, Tokyo (JP)

(72) Inventor: Hidehiro Naito, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/260,639

(22) Filed: Apr. 24, 2014

(65) Prior Publication Data

US 2014/0334673 A1    Nov. 13, 2014

(30) Foreign Application Priority Data

May 9, 2013    (JP) ................................. 2013-099622

(51) Int. Cl.
*G06K 9/00*    (2006.01)
*G06K 9/20*    (2006.01)

(52) U.S. Cl.
CPC .......... *G06K 9/00624* (2013.01); *G06K 9/2027* (2013.01); *G06K 2209/17* (2013.01)

(58) Field of Classification Search
CPC .................. A47F 9/048; G06Q 20/203; G06T 2207/30108; G06T 7/001; G07G 1/0063
See application file for complete search history.

(56) References Cited

U.S. PATENT DOCUMENTS

| | | | |
|---|---|---|---|
| 6,749,120 B2 * | 6/2004 | Hung et al. | 235/472.01 |
| 7,100,824 B2 * | 9/2006 | Ostrowski et al. | 235/383 |
| 8,494,909 B2 * | 7/2013 | Goncalves | 705/22 |
| 2009/0188981 A1 | 7/2009 | Iizaka et al. | |
| 2012/0217302 A1 * | 8/2012 | Naito et al. | 235/455 |

FOREIGN PATENT DOCUMENTS

| | | |
|---|---|---|
| JP | 2006-277255 | 10/2006 |
| JP | 2008-257462 | 10/2008 |
| JP | 2009-176037 | 8/2009 |
| JP | 2010-198137 | 9/2010 |
| JP | 2012-174229 | 9/2012 |

OTHER PUBLICATIONS

Office Action of Notification of Reasons for Refusal for Japanese Patent Application No. 2013-099622 Dated Jul. 1, 2014, 6 pages.

* cited by examiner

*Primary Examiner* — Tom Y Lu
(74) *Attorney, Agent, or Firm* — Amin, Turocy & Watson, LLP

(57) ABSTRACT

A commodity recognition apparatus, which recognizes, from an image captured by an image capturing section and stored in a storage section, a commodity imaged in the image, identifies, for each image captured by the image capturing section, an image capturing condition of light source for the image. The commodity recognition apparatus selects the image captured by the image capturing section under a given image capturing condition identified and displays the selected image on a display section.

5 Claims, 8 Drawing Sheets

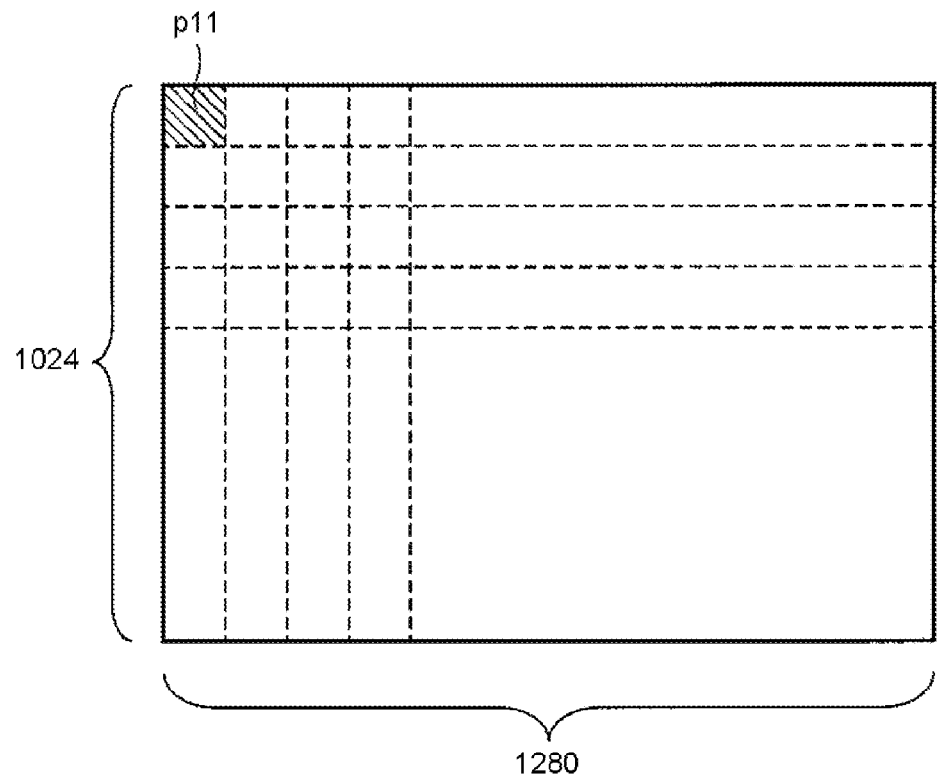

COMMODITY RECOGNITION APPARATUS AND METHOD FOR RECOGNIZING COMMODITY BY THE SAME

CROSS-REFERENCE TO RELATED APPLICATION

This application is based upon and claims the benefit of priority from Japanese Patent Application No. 2013-099622, filed May 9, 2013, the entire contents of which are incorporated herein by reference.

FIELD

Embodiments described herein relate to a commodity recognition apparatus which recognizes a commodity based on an image captured by an image capturing section and a method for recognizing the commodity by the commodity recognition apparatus.

BACKGROUND

There is a technology in which a commodity is recognized from an image captured by an image capturing section. As one example of the technology, there is a technology in which a code symbol such as a barcode and the like attached to a commodity is read from an image obtained by photographing the commodity, and then the commodity is recognized. As another example, there is also a technology in which an appearance feature amount of a commodity is extracted from an image obtained by photographing the commodity, and the commodity is recognized based on the feature amount data.

As all of these commodity recognition apparatuses need to achieve the brightness required to capture an image, a commodity serving as an image capturing object is irradiated with an illumination light. However, if the luminance of the image is too high, the commodity recognition apparatus cannot recognize the commodity. Therefore, the commodity recognition apparatus calculates the luminance of the captured image, and temporarily reduces the light quantity of the illumination light every time the luminance of the captured image exceeds a given luminance. In this way, the commodity recognition apparatus dynamically adjusts the luminance for each image to improve the recognition rate.

BRIEF DESCRIPTION OF THE DRAWINGS

FIG. 5 is a schematic view illustrating a frame image stored in an image memory;

FIG. 6 is a schematic view illustrating a conversion table of an illumination mode/identification code;

DETAILED DESCRIPTION

In accordance with one embodiment, a commodity recognition apparatus comprises an image capturing section, a light source, a storage module, a storage section, an identification module, a selection module, a control module, a display section and a recognition module. The image capturing section photographs an object subject to the recognition to capture the image of the object. The light source irradiates the object photographed by the image capturing section with an illumination light. The storage module stores the image of the object in the storage section. The identification module identifies, for each image stored in the storage section, an image capturing condition of the light source for the image. The selection module selects the image of the object photographed by the image capturing section under a given image capturing condition identified by the identification module. The control module displays the image of the object selected by the selection module on the display section. The recognition module recognizes, from the image stored in the storage section, the object imaged in the image as a specific commodity.

The commodity recognition apparatus according to the embodiment is described below with reference to the accompanying drawings.

The present embodiment is applied to a scanner apparatus which extracts an appearance feature amount of a commodity from an image obtained by photographing the commodity and recognizes the commodity based on the feature amount data.

Figure 1:
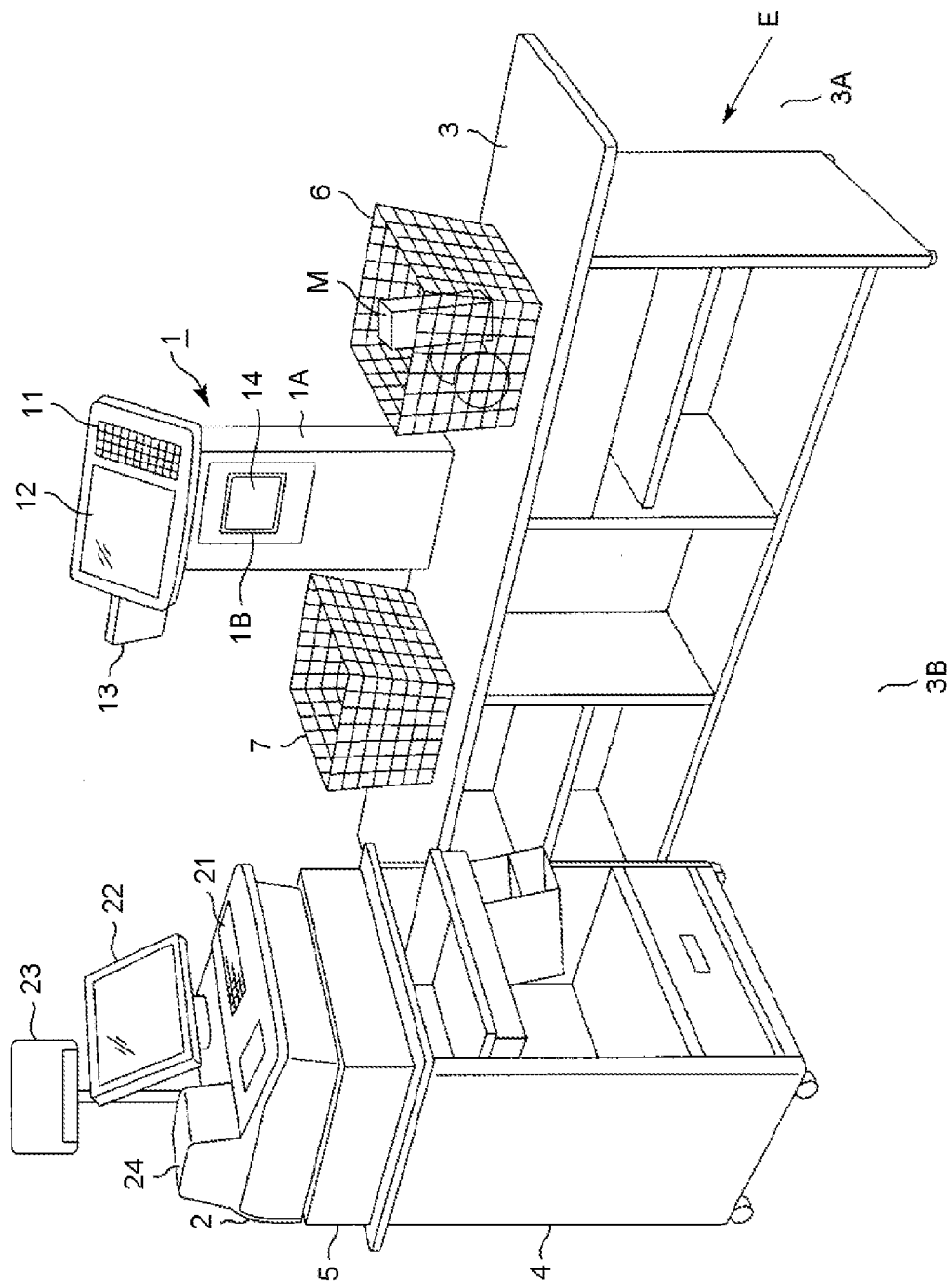
FIG. 1 is an external view of a store checkout system according to one embodiment.

FIG. 1 is an external view of a store checkout system which uses the scanner apparatus. The system includes a scanner apparatus 1 as a registration section for registering commodities purchased by a customer and a POS (Point Of Sales) terminal 2 as a settlement section for processing the payment of a customer. The scanner apparatus 1 is mounted on a checkout counter 3. The POS terminal 2 is arranged on a register table 4 through a drawer 5. The scanner apparatus 1 and the POS terminal are electrically connected with each other through a communication cable 8 (refer to FIG. 2).

The scanner apparatus 1 comprises a keyboard 11, a touch panel 12 and a display for customer 13. Those display and operation devices (keyboard 11, touch panel 12 and display for customer 13) are mounted on a thin rectangular-shaped housing 1A constituting a main body of the scanner apparatus 1.

An image capturing section 14 is installed in the housing 1A. In addition, a reading window 1B is formed in a rectangular shape at the front side of the housing 1A. The image capturing section 14 comprises a CCD (Charge Coupled Device) image capturing element as an area image sensor, a drive circuit thereof, and an image capturing lens for focusing an image of the image capturing area on the CCD image capturing element. The image capturing area refers to an area of a frame image which is focused on the area of the CCD image capturing element through the image capturing lens through the reading window 1B. The image capturing section 14 outputs the image of the image capturing area focused on the CCD image capturing element through the image capturing lens. The area image sensor, which is not limited to the CCD image capturing element, may be, for example, a CMOS (complementary metal oxide semiconductor) element.

The POS terminal 2 comprises a keyboard 21, a display for operator 22, a display for customer 23 and a receipt printer 24 as devices required for settlement.

The checkout counter 3 is arranged along a customer passage 3A. The register table 4 is arranged at a side opposite to the customer passage 3A with respect to the checkout counter 3 at a substantially right angle to the checkout counter 3. Specifically, the register table 4 is located at the end of the checkout counter 3 at the downstream side of the passage 3A in a movement direction of a customer indicated by an arrow E. Therefore, the checkout counter 3 and the register table 4 are arranged in an L-shape to define a space 3B for a shop clerk in charge of settlement, i.e., so called casher.

At the approximate center of the checkout counter 3, the housing 1A of the scanner apparatus 1 is vertically arranged such that the keyboard 11, the touch panel 12 and the reading window 1B are directed to the space for a shop clerk (cashier). The display for customer 13 of the scanner apparatus 1 is arranged on the housing 1A, facing to the customer passage 3A.

A first upper surface portion of the checkout counter 3 at the upstream side thereof through the scanner apparatus 1 in the customer movement direction serves as a space for placing a shopping basket 6 in which an unregistered commodity M purchased by a customer is held. On the other side, a second upper surface portion at the downstream side through the scanner apparatus 1 serves as an another space for placing a shopping basket 7 in which a commodity M registered by the scanner apparatus 1 is held.

Figure 2:
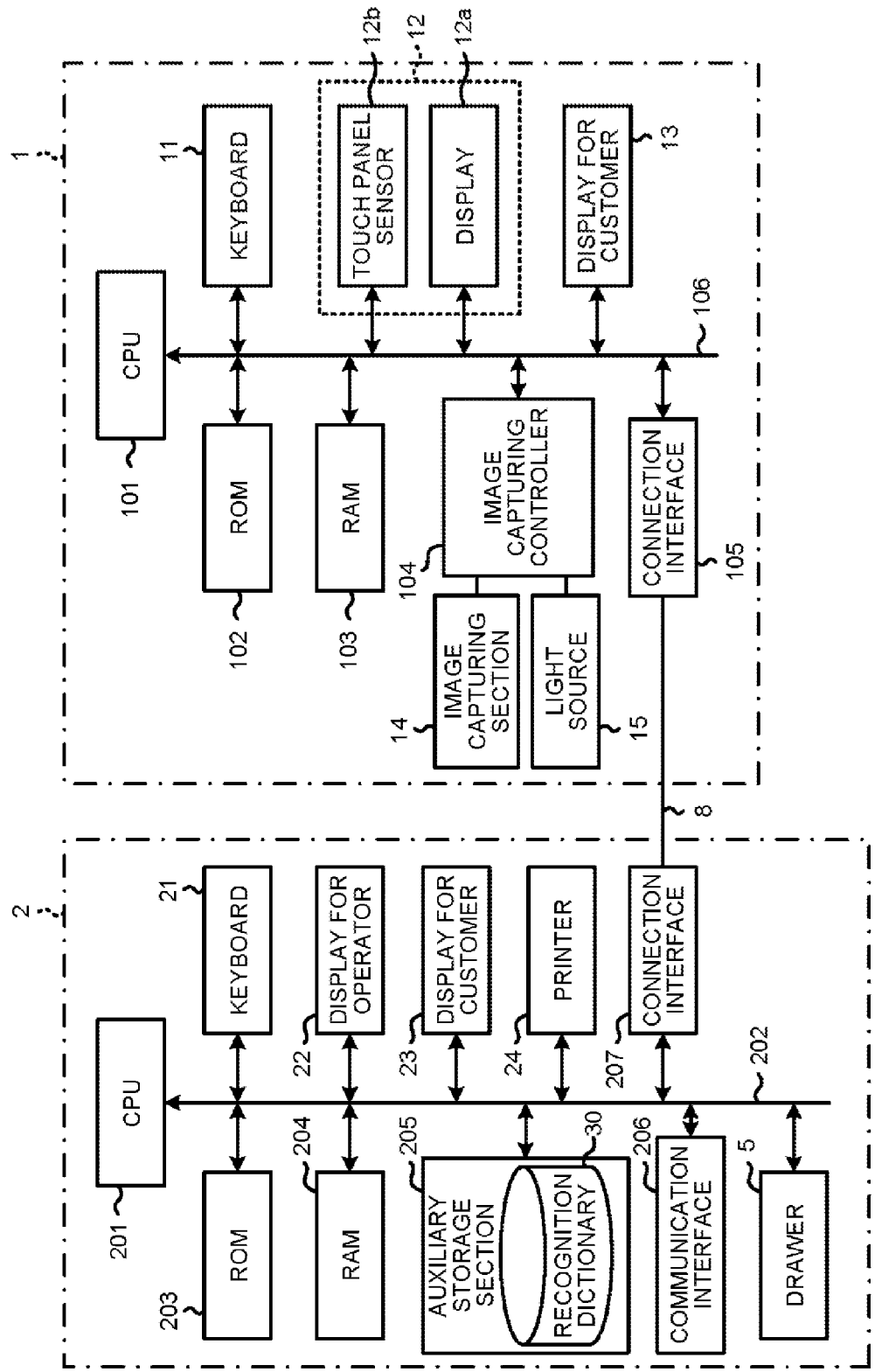
FIG. 2 is a block diagram illustrating hardware constitutions of a scanner apparatus and a POS terminal.

FIG. 2 is a block diagram illustrating the hardware constitutions of the scanner apparatus 1 and the POS terminal 2. The scanner apparatus 1 includes a CPU (Central Processing Unit) 101, a ROM (Read Only Memory) 102, a RAM (Random Access Memory) 103, an image capturing controller 104 and a connection interface 105 which are connected with each other via a bus line 106. Further, the keyboard 11, the touch panel 12 and the display for customer 13 are also connected with the bus line 106 via an input-output circuit (not shown).

The CPU 101 corresponds to a central part of a computer. The CPU 101 controls each section to realize various functions as the scanner apparatus 1 according to an operating system or an application program.

The ROM 102 corresponds to a main storage part of the computer. The ROM 102 stores the operating system and the application program mentioned above. The ROM 102 also stores, as occasion demands, data required to execute various processing by the CPU 101. The application program includes a commodity recognition program described later.

The RAM 103 is also a main storage part of the computer mentioned above. The RAM 103 stores data required to execute various processing by the CPU 101 as needed. Further, the RAM 103 is also used as a work area for the CPU 101 when various processing is executed.

The image capturing controller 104 controls the image capturing section 14 and an illumination light source 15 accompanying the image capturing section 14. The illumination light source 15 radiates an illumination light to an object subject to the recognition, e.g., commodity photographed by the image capturing section 14.

The connection interface 105 is connected with a connection interface 207 of the POS terminal 2 described later through the communication cable 8. Through this connection, the scanner apparatus 1 and the POS terminal 2 are electrically connected with each other.

The touch panel 12 comprises a panel type display 12a and a touch panel sensor 12b overlaid on the screen of the display 12a.

The POS terminal 2 also carries a CPU 201. The CPU 201 is connected with a ROM 203, a RAM 204, an auxiliary storage section 205, a communication interface 206 and a connection interface 207 via a bus line 202. In addition, the keyboard 21, display for operator 22, display for customer 23, printer 24 and drawer 5 are respectively connected with the bus line 202 via an input-output circuit (not shown).

The CPU 201 corresponds to a central part of a computer. The CPU 201 controls each section to realize various functions as the POS terminal 2 according to an operating system or an application program.

The ROM 203 corresponds to a main storage part of the computer. The ROM 203 stores the operating system and the application program mentioned above. The ROM 203 also stores data required to execute various processing by the CPU 201 as an occasion demands.

The RAM 204 corresponds to a main storage part of the computer mentioned above. The RAM 204 stores data required to execute various processing by the CPU 201 as needed. Further, the RAM 204 may also be used as a work area for the CPU 201 when carrying out various processing.

The auxiliary storage section 205, which is, for example, a HDD (Hard Disk Drive) device or a SSD (Solid State Drive) device, further stores data files such as a recognition dictionary file 30 and the like, in addition to various programs.

A plurality of recognition dictionary records including a commodity ID, commodity name and feature amount data are stored in the recognition dictionary file 30. The commodity ID is a unique code for identifying each commodity individually. The commodity name is the name of the commodity specified with the corresponding commodity ID. The feature amount data represents appearance feature amount serving as surface information (appearance shape, hue, pattern, concave-convex state and the like) of a commodity identified with the corresponding commodity ID in the form of parameters.

The communication interface 206 is connected with a store server (not shown) via a network such as a LAN (Local Area Network) and the like. Through this connection, the POS terminal 2 can perform a transmission/reception of data with the store server.

The connection interface 207 is connected with the connection interface 105 of the scanner apparatus 1 via the communication cable 8. Through the connection, the POS terminal 2 receives information from the scanner apparatus 1. The POS terminal 2 performs a transmission/reception of data signals with the keyboard 11, the touch panel 12 and the display for customer 13 of the scanner apparatus 1. On the other hand, the scanner apparatus 1 can access the data file stored in the auxiliary storage section 205 of the POS terminal 2 through this connection.

Figure 3:
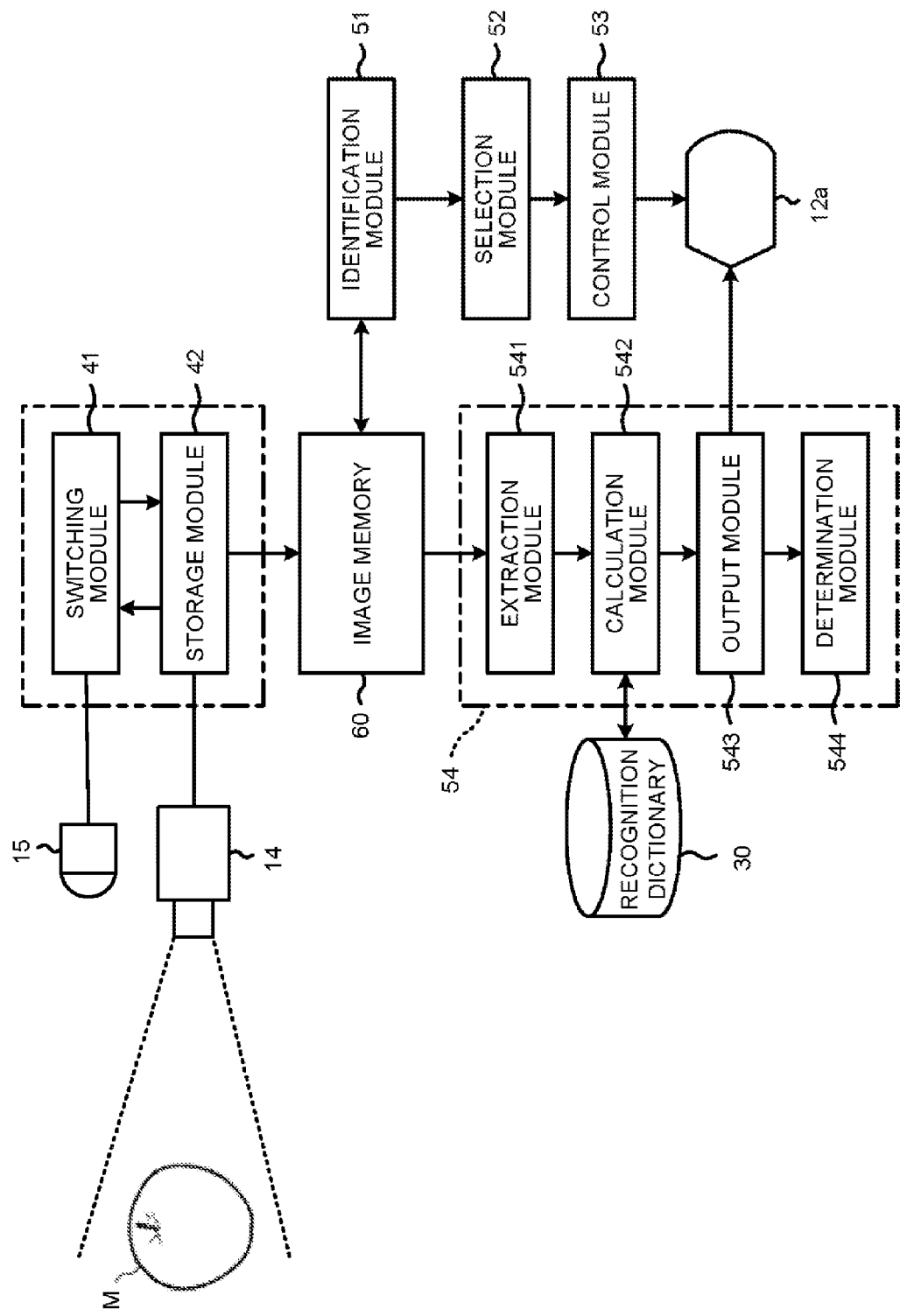
FIG. 3 is a block diagram illustrating a commodity recognition function of the scanner apparatus.

FIG. 3 is a block diagram illustrating the commodity recognition function of the scanner apparatus 1. The scanner apparatus 1 realizes the commodity recognition function through a switching module 41, a storage module 42, an identification module 51, a selection module 52, a control module 53 and a recognition module 54. In these modules, the switching module 41 and the storage module 42 are realized through the image capturing controller 104.

The switching module 41 switches illumination modes which are set in advance as an image capturing condition of the image captured by the image capturing section 14. In the present embodiment, an illumination mode A in which a light quantity of the illumination light when capturing an image is a first light quantity, an illumination mode B in which the light quantity of the illumination light is a second light quantity smaller than the first light quantity and an illumination mode C in which the light quantity of the illumination light is a third light quantity further smaller than the second light quantity are set as the illumination modes.

Figure 4:
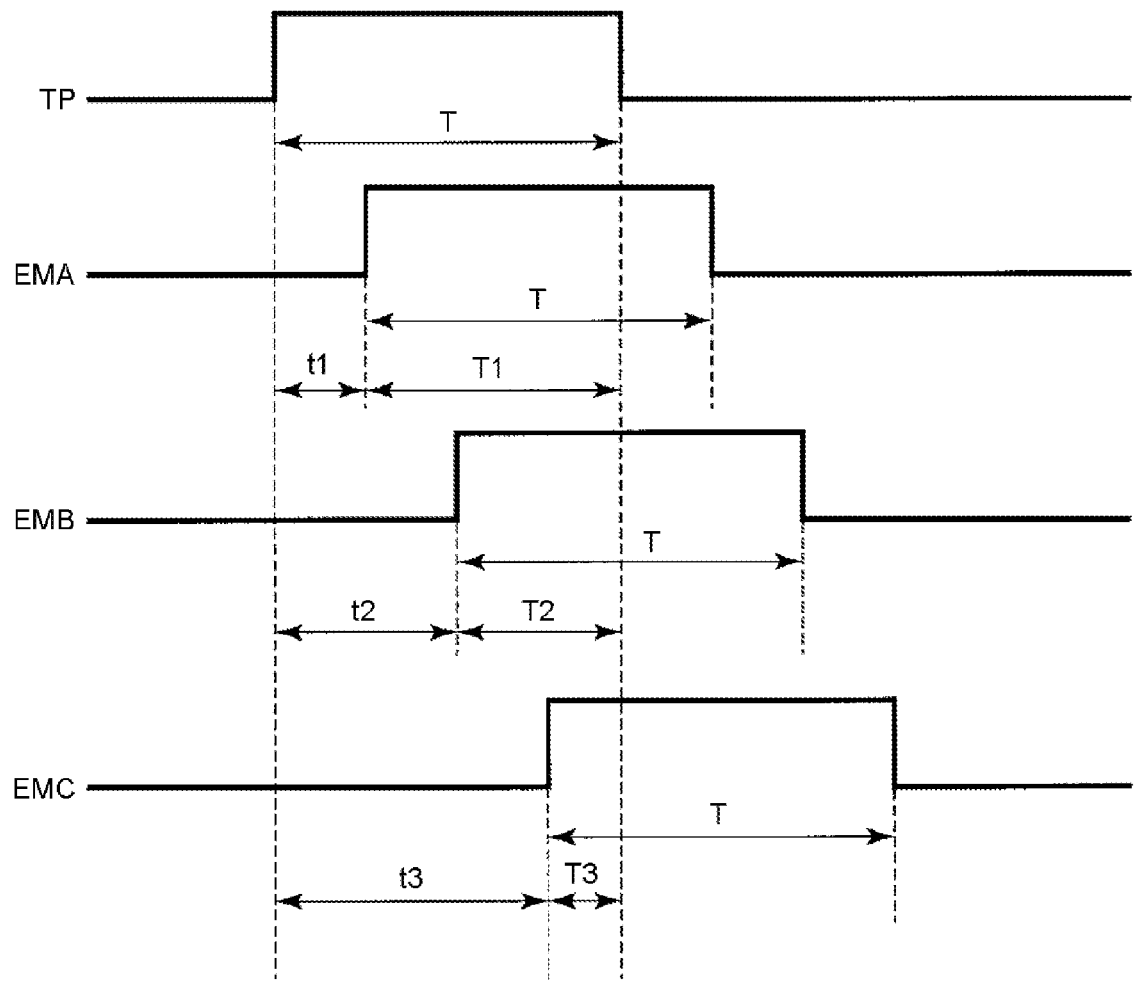
FIG. 4 is a timing diagram illustrating the relation between an image capturing signal TP and light emission signals EMA, EMB and EMC for each illumination mode.

FIG. 4 is a timing diagram illustrating the relation between an image capturing signal TP for instructing the image capturing section 14 to carry out image capturing operation, and light emission signals EMA, EMB and EMC for corresponding illumination modes for instructing the light source 15 to radiate an illumination light. The image capturing controller 104 outputs an image capturing signal TP having a time width T to the image capturing section 14 for each given period (for example, every 1/30 second). In the image capturing section 14, the image of the image capturing area is focused on the CCD image capturing element through the image capturing lens, and a resulting frame image is output to the image capturing controller 104 while the image capturing signal TP is being input.

The image capturing controller 104 outputs a light emission signal EMA, EMB or EMC of the same period having the same time width T as the image capturing signal TP to the light source 15 in response to the illumination modes A, B or C. The image capturing controller 104 outputs a light emission signal EMA with a delay of a time t1 compared with the image capturing signal TP in the illumination mode A; outputs a light emission signal EMB with a delay of a time t2 (t1<t2) compared with the image capturing signal TP in the illumination mode B; and outputs a light emission signal EMC with a delay of a time t3 (t2<t3) compared with the image capturing signal TP in the illumination mode C.

In this way, in the illumination mode A, an image irradiated with illumination light in a period T1 in which the image capturing signal TP overlaps with the light emission signal EMA is captured by the image capturing section 14. Similarly, if the illumination mode B is selected, an image irradiated with illumination light in a period T2 in which the image capturing signal TP overlaps with the light emission signal EMB is captured. If the illumination mode C is selected, an image irradiated with illumination light in a period T3 in which the image capturing signal TP overlaps with the light emission signal EMC is captured.

As shown in FIG. 4, compared with the overlap period T1 in the illumination mode A, the overlap period T2 in the illumination mode B is shorter, and the overlap period T3 in the illumination mode C is the shortest. Thus, compared with the illumination mode A, the light quantity of the illumination light in the image capturing period in the illumination mode B is smaller than that in the illumination mode A, and the light quantity of the illumination light in the image capturing period in the illumination mode C is the smallest. As a result, as to the luminance of the image captured by the image capturing section 14, the luminance of the image captured in the illumination mode B is lower than that in the illumination mode A, and the luminance of the image captured in the illumination mode C is the lowest.

The time widths of the light emission signals EMA, EMB and EMC are not necessarily to be set equal to the time width T of the image capturing signal TP. The time width may be shorter than the time width T as long as at least the time width is longer than the overlap period T1 in the illumination mode A.

The storage module 42 stores each frame of the images captured by the image capturing section 14 in an image memory 60 serving as a storage section. The image memory 60 is formed on the RAM 103. In the present embodiment, as shown in FIG. 5, an image of one frame has a resolution of SXGA (1280 dots×1024 lines). The image capturing controller 104 replaces the data (8 bit) of one pixel p11 positioned at the upper left of the frame image with an identification code according to which the illumination mode indicating the image capturing condition of the image can be identified and then stores the frame image in the image memory 60.

Specifically, as shown in FIG. 6, the image capturing controller 104 includes a conversion table 70 in which 2-bit identification codes "00", "01" and "10" are correspondingly set for illumination modes A, B and C. As to the frame image captured in the illumination mode A, the image capturing controller 104 replaces the low 2-bit of the 8-bit data of the pixel p11 with the identification code "00", and then stores the frame image in the image memory 60. Similarly, as to the frame image captured in the illumination mode B, the low 2-bit of the 8-bit data of the pixel p11 is replaced with the identification code "01", and then the frame image is stored in the image memory 60; as to the frame image captured in the illumination mode C, the low 2-bit of the 8-bit data of the pixel p11 is replaced with the identification code "10", and then the frame image is stored in the image memory 60.

Figure 7:
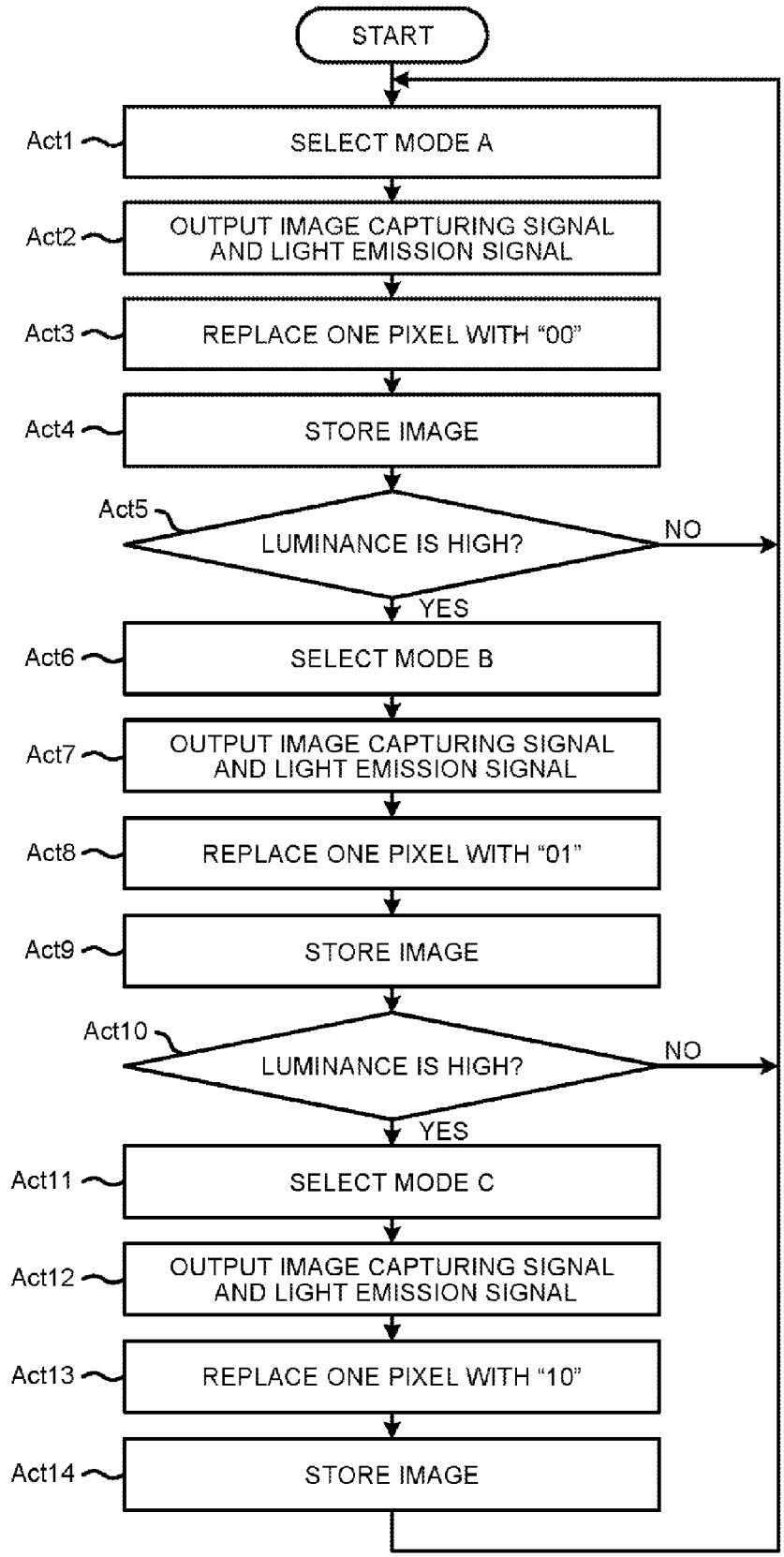
FIG. 7 is a flowchart illustrating a control procedure of an image capturing controller.

FIG. 7 is a flowchart illustrating a control procedure of the image capturing controller 104. The procedure is started when an ON-signal of image capturing is sent from the CPU 101, and is ended when an OFF-signal of image capturing is sent. The ON-signal of image capturing and the OFF-signal of image capturing are described later.

When the ON-signal of image capturing is sent from the CPU 101, the image capturing controller 104 selects the illumination mode A (ACT 1: switching module 41). Then the image capturing controller 104 outputs, at timing set in the illumination mode A, the image capturing signal TP and the light emission signal EMA to the image capturing section 14 and the light source 15, respectively (ACT 2).

In this way, as the frame image captured by the image capturing section 14 is sent to the image capturing controller 104, the image capturing controller 104 replaces the low 2-bit of the 8-bit data of the pixel p11 of the frame image with the identification code "00" (ACT 3). Then, the image capturing controller 104 stores the frame image containing the identification code "00" in the image memory 60 (ACT 4: storage module 42).

The image capturing controller 104 determines whether or not the luminance of the frame image is high, for example, by determining whether or not the number of white pixels contained in the image is greater than a specified number thereof br (ACT 5). The specified number of white pixels br mentioned herein is 1/64 of the total number (1280×1024) of pixels of the frame image having a resolution of SXGA. In the frame image having a resolution of SXGA, if more than 1/64 of the total number of pixels is the white pixels, there may be a possibility that the information of gradation of the bright part of the image cannot be obtained, that is, the image has blown out highlights.

If it is determined that the luminance of the frame image is not high (NO in ACT 5), the image capturing controller 104 returns to carryout the processing in ACT 1. The image capturing controller 104 outputs the image capturing signal TP and the light emission signal EMA at the timing set in the illumination mode A. Then the image capturing controller 104 replaces the low 2-bit of the 8-bit data of the pixel p11 of the frame image captured by the image capturing section 14 with the identification code "00", and then stores the frame image in the image memory 60 (ACTs 2, 3 and 4).

On the contrary, if it is determined that the luminance of the frame image is high (YES in ACT 5), the image capturing controller 104 selects the illumination mode B (ACT 6: switching module 41). Then the image capturing controller 104 outputs, at timing set in the illumination mode B, the image capturing signal TP and the light emission signal EMB to the image capturing section 14 and the light source 15, respectively (ACT 7).

In this way, as the frame image captured by the image capturing section 14 is sent to the image capturing controller 104, the image capturing controller 104 replaces the low 2-bit of the 8-bit data of the pixel p11 of the frame image with the identification code "01" (ACT 8). Then, the image capturing controller 104 stores the frame image containing the identification code "01" in the image memory 60 (ACT 9: storage module 42).

Then the image capturing controller 104 determines, like the processing in ACT 5, whether or not the luminance of the frame image is high (ACT 10). If the luminance of the frame image is not high (NO in ACT 10), the image capturing controller 104 returns to carry out the processing in ACT 1. The image capturing controller 104 selects the illumination mode A, and then outputs the image capturing signal TP and the light emission signal EMA at the timing set in the illumination mode A. Then the image capturing controller 104 replaces the low 2-bit of the 8-bit data of the pixel p11 of the frame image captured by the image capturing section 14 with the identification code "00", and then stores the frame image in the image memory 60 (ACTs 2, 3 and 4).

On the contrary, if it is determined that the luminance of the frame image is high (YES in ACT 10), the image capturing controller 104 selects the illumination mode C (ACT 11: switching module 41). Then the image capturing controller 104 outputs, at timing set in the illumination mode C, the image capturing signal TP and the light emission signal EMC to the image capturing section 14 and the light source 15, respectively (ACT 12).

In this way, as the frame image captured by the image capturing section 14 is sent to the image capturing controller 104, the image capturing controller 104 replaces the low 2-bit of the 8-bit data of the pixel p11 of the frame image with the identification code "10" (ACT 13). Then, the image capturing controller 104 stores the frame image containing the identification code "10" in the image memory 60 (ACT 14: storage module 42).

Sequentially, the image capturing controller 104 returns to carry out the processing in ACT 1. The image capturing controller 104 selects the illumination mode A, and then outputs the image capturing signal TP and the light emission signal EMA at the timing set in the illumination mode A. Then the image capturing controller 104 replaces the low 2-bit of the 8-bit data of the pixel p11 of the frame image captured by the image capturing section 14 with the identification code "00", and then stores the frame image in the image memory 60 (ACTs 2, 3 and 4).

In this way, the image capturing controller 104 sets the illumination mode A as a default mode (normal mode). Then, if it is determined that the luminance of the frame image captured in the illumination mode A is high, the image capturing controller 104 switches the image capturing condition for the next frame image to the illumination mode B. As a result, if it is determined that the luminance of the frame image captured in the illumination mode B is not high, the image capturing controller 104 switches the image capturing condition for the next frame image back to the illumination mode A.

On the contrary, if it is determined that the luminance of the frame image captured in the illumination mode B is still high as well, the image capturing controller 104 switches the image capturing condition for the next frame image to the illumination mode C. In this case, no matter the luminance of the frame image captured in the illumination mode C is high or low, the image capturing controller 104 switches the image capturing condition for the next frame image back to the illumination mode A.

Thus, in the image memory 60, the frame image captured under the image capturing condition of the illumination mode A is acquired at least once in three times. The one pixel p11 positioned in the upper left of each frame image is replaced with the identification code indicating the illumination mode at the time the frame image is captured.

The identification module 51, the selection module 52, the control module 53 and the recognition module 54 in FIG. 3 are realized by the CPU 101.

The identification module 51 identifies, for each frame image stored in the image memory 60, the image capturing condition of the image. The CPU 101 acquires the 8-bit data of the pixel p11 from the frame image read out of the image memory 60. If the low 2-bit of the 8-bit data is "00", the CPU 101 identifies that the image capturing condition of the frame image is the illumination mode A. Similarly, if the low 2-bit of the 8-bit data of the pixel p11 is "01", the CPU 101 identifies that the image capturing condition of the frame image is the illumination mode B, and if the low 2-bit of the 8-bit data is "10", the CPU 101 identifies that the image capturing condition of the frame image is the illumination mode C.

The selection module 52 selects the image captured under the given image capturing condition in the image capturing section 14. In the present embodiment, the selection module 52 selects the image captured in the illumination mode A.

The control module 53 displays the image selected by the selection module 52 on the display section (display 12a of the touch panel 12). The CPU 101 forms an image area 71 (refer to FIG. 8) on the screen of the touch panel 12. Then the CPU 101 displays the images selected by the selection module 52 in the image area 71 in sequence.

Figure 8:
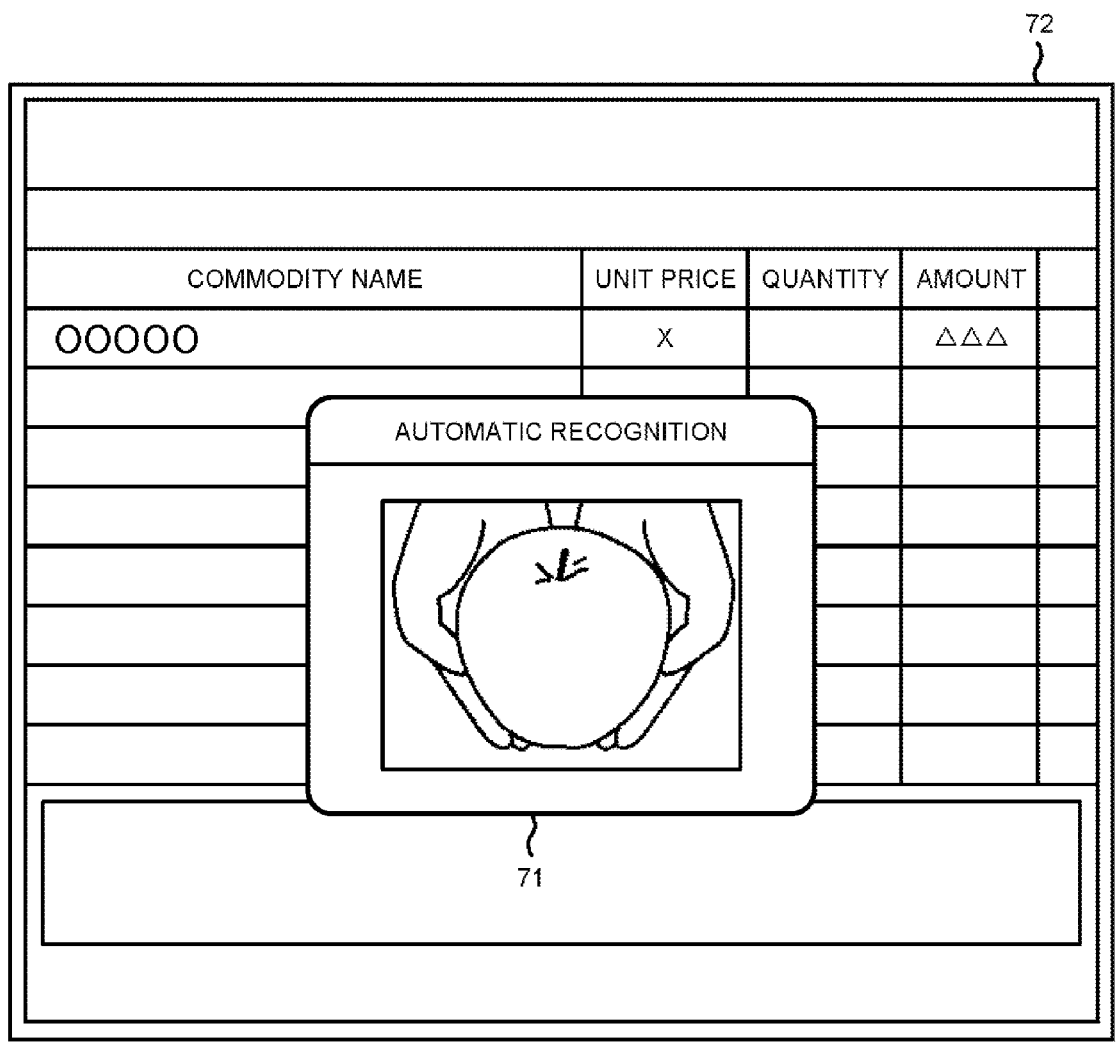
FIG. 8 is a schematic view illustrating one example of an image area displayed on a touch panel.

One example of the image area 71 is shown in FIG. 8. The image area 71 is displayed over a registration details screen 72 of the commodity transaction. The registration details screen 72 is created in the POS terminal 2. The CPU 201 of the POS terminal 2 sends the data of the registration details screen 72 to the scanner apparatus 1 through the connection interface 207, and displays the data on the display 12a.

The recognition module 54, which recognizes the commodity imaged in the image stored in the image memory 60, includes an extraction module 541, a calculation module 542, an output module 543 and a determination module 544.

Figure 9:
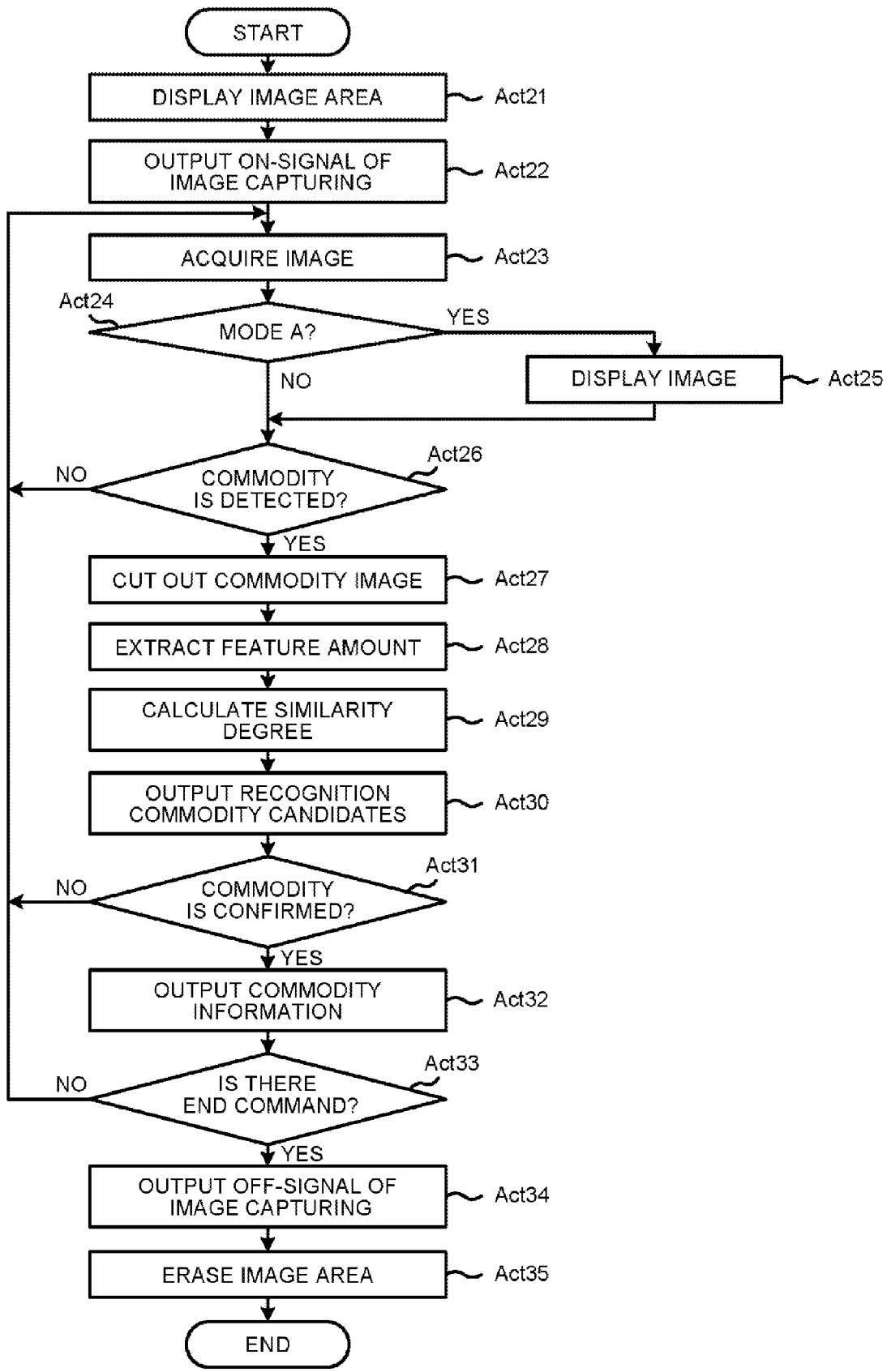
FIG. 9 is a flowchart illustrating a procedure of an information processing executed by a CPU of the scanner apparatus according to a commodity recognition program.

FIG. 9 is a flowchart illustrating a procedure of an information processing executed by the CPU 101 according to the commodity recognition program. When the commodity recognition program is started, the CPU 101 starts the processing according to the procedure shown in the flowchart. First, the CPU 101 displays the image area 71 on the display 12a (ACT 21). Then the CPU 101 outputs an ON-signal of image capturing to the image capturing controller 104 (ACT 22).

As the processing according to the procedure shown in the flowchart in FIG. 7 is executed in the image capturing controller 104 in response to the ON-signal of image capturing, the CPU 101 acquires the frame images from the image memory 60 in the image capturing order (ACT 23). The CPU 101 determines whether or not the acquired frame image is the image captured in the illumination mode A (ACT 24: identification module 51). If the acquired frame image is captured in the illumination mode A (YES in ACT 24: selection module 52), the CPU 101 displays the image in the image area 71 (ACT 25: control module 53). On the contrary, if the acquired frame image is not captured in the illumination mode A, the acquired frame image is captured either in the illumination mode B or the illumination mode C (NO in ACT 24: selection module 52), and thus the CPU 101 does not display the image in the image area 71.

The CPU 101 confirms whether or not a commodity M is photographed in the acquired frame image (ACT 26). Specifically, the CPU 101 extracts a contour line and the like from the binary image of the frame image. Then the CPU 101 tries to extract the contour of the object imaged in the frame image. If the contour of the object is extracted, the CPU 101 regards the image in the contour as the commodity M.

If the commodity M is not photographed in the frame image (NO in ACT 26), the CPU 101 returns to carry out the processing in ACT 23. The CPU 101 acquires a next frame image from the image memory 26. If the frame image is captured in the illumination mode A, the frame image is displayed in the image area 71 (ACT 25). Further, the CPU 101 confirms whether or not the commodity M is photographed in the frame image (ACT 26).

If the commodity M is photographed in the frame image (YES in ACT 26), the CPU 101 cuts out the commodity image from the frame image (ACT 27). Then the CPU 101 extracts the appearance feature amount, such as the shape, surface hue, pattern, concave-convex state and the like, of the commodity M from the commodity image (ACT 28: extraction module 541).

The CPU 101 compares the appearance feature amount of the commodity M with the feature amount data of each commodity stored in the recognition dictionary file 30 in sequence, to calculate a similarity degree indicating how much similar the appearance feature amount is to the feature amount data for each commodity registered in the dictionary (ACT 29: calculation module 542). Sequentially, the CPU 101 outputs, for example, the top five commodities in the descending order of similarity degree to the touch panel 12, as recognition commodity candidates, in a selectable manner (ACT 30: output module 543).

The CPU 101 determines whether or not the registration commodity is confirmed from the recognition commodity candidates (ACT 31). If one item is selected from the recognition commodity candidates through an input operation on the keyboard 11 or the touch panel 12, the CPU 101 determines the item as the commodity purchased by the customer. Alternatively, the CPU 101 determines the commodity having the highest similarity degree in the recognition commodity candidates as the commodity purchased by the customer (determination module 544).

If the registration commodity is not determined (NO in ACT 31), the CPU 101 returns to carry out the processing in ACT 23.

If the registration commodity is determined (YES in ACT 31), the CPU 101 outputs the information of the commodity to the POS terminal 2 (ACT 32). In this way, in the POS terminal 2, the sales data of the determined commodity is registered, and the name, unit price, quantity and amount of the commodity are displayed on the registration details screen 72.

The CPU 101 determines whether or not there is an end command (ACT 33). For example, if the total key of the keyboard 11 is operated, and the end of the commodity registration in one transaction is declared, the CPU 101 determines that there is an end command. If there is no end command (NO in ACT 33), the CPU 101 returns to carry out the processing in ACT 23.

If there is an end command (YES in ACT 33), the CPU 101 outputs an OFF-signal of image capturing to the image capturing controller 104 (ACT 34). Then the CPU 101 erases the image area 71 (ACT 35). In this way, the commodity recognition program is ended.

As stated above, the scanner apparatus 1 includes the illumination mode A in which the light quantity of the illumination light when capturing an image is the first light quantity, the illumination mode B in which the light quantity of the illumination light is the second light quantity smaller than the first light quantity and the illumination mode C in which the light quantity of the illumination light is the third light quantity smaller than the second light quantity, as the image capturing conditions in the image capturing section 14. The image capturing controller 104 calculates the luminance of the image every time the image capturing section 14 captures an image, and temporarily switches the current illumination mode to a mode in which the light quantity is smaller than that in the current mode to capture a next image if the luminance of the image is higher than the predetermined luminance. In this way, the scanner apparatus 1 dynamically adjusts the luminance of the image when photographing the commodity held to the reading window 1B, thereby maintaining a high commodity recognition rate.

In such a scanner apparatus 1, the image area 71 is formed on the screen of the touch panel 12, and the image captured by the image capturing section 14 is displayed as a moving image or a motion-image in the image area 71 in real time. However, the CPU 101 selects the image captured in the illumination mode A from the images captured by the image capturing section 14 and displays the selected image in the image area 71. The images captured in the illumination mode B or C are not displayed in the image area 71.

Therefore, only the image captured in the illumination mode A in which the illumination light quantity is the first light quantity at the time of photographing, as described above, is displayed in the image area 71. As a result, unpleasant phenomenon in which flicker of the screen is caused by the high-speed switching of the luminance of images even if the commodity (image capturing object) is not changed does not occur, and therefore, the user does not have uncomfortable feeling caused by such phenomenon.

Incidentally, in the scanner apparatus 1, at least one frame of three frames is the image captured in the illumination mode A. If the image capturing period of one frame is set to 1/30 second, the displayed image is switched to a next image at an interval of 1/10 second at the latest. Thus, the user has no incompatibility to the images displayed in the image area 71 as motion images even if only the images captured in the illumination mode A are selected.

The present invention is not limited to the embodiment described above.

In the embodiment described above, it is exemplified that the present invention is applied to the commodity recognition apparatus (scanner apparatus 1) which extracts the appearance feature amount of a commodity from the image obtained by photographing the commodity, and recognizes the commodity based on the feature amount data. However, the application of the present invention is not limited to this. For example, the present invention can be similarly applied to a commodity recognition apparatus which reads a code symbol such as a barcode and the like attached to a commodity from an image obtained by photographing the commodity and then recognizes the commodity.

Further, in the embodiment described above, illumination modes in which the irradiation time of the illumination light when capturing an image is adjusted are exemplified as the image capturing conditions of images. However, the image capturing condition is not limited to this. For example, the luminance of the image may be changed by adjusting the intensity of the illumination light when capturing an image. Alternatively, the luminance of the image may be changed by adjusting the time of the operation of a shutter in the image capturing section 14.

In the embodiment described above, the data corresponding to the given pixel of the image is replaced with the identification code of the illumination mode serving as the image capturing condition of the image, and thus the image capturing condition of the image can be identified by the identification code. The module for identifying the image capturing condition is not limited to this. For example, the image capturing condition may be identified by adding data used for identifying the image capturing condition for each frame of the image.

In addition, the transfer of the commodity recognition apparatus is generally carried out in a state where the programs such as commodity recognition program are stored in the ROM. However, the preset invention is not limited to this. The commodity recognition program and the like transferred separately from a computer device may be written in a writable storage device of the computer device through an operation of a user and the like. The transfer of the commodity recognition program and the like may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
    an image capturing section configured to photograph an object subject to the recognition to capture image of the object;
    a light source configured to irradiate the object with an illumination light therefrom when photographing the object;
    a storage module configured to store the image of the object in a storage section;
    an identification module configured to identify, for each image of the object stored in the storage section, an image capturing condition of the light source for the image;
    a selection module configured to select the image captured by the image capturing section under a given image capturing condition identified by the identification module;
    a control module configured to display the image of the object selected by the selection module on a display section; and
    a recognition module configured to recognize, from the image stored in the storage section, the object imaged in the image as a specific commodity, wherein
    the storage module replaces the data corresponding to a given pixel of the image with data indicating the image capturing condition of the image to store the image in the storage section, and
    the identification module identifies the image capturing condition based on the data corresponding to the given pixel.

2. The commodity recognition apparatus according to claim 1, wherein
    the identification module identifies whether the image capturing condition of the light source for the image is a first image capturing condition in which the luminance of the image is a first luminance or a second image capturing condition in which the luminance of the image is a second luminance lower than the first luminance.

3. The commodity recognition apparatus according to claim 2, wherein
    the selection module selects the image captured under the first image capturing condition.

4. The commodity recognition apparatus according to claim 1, wherein
    the recognition module extracts the appearance feature amount of the commodity imaged in the image, and recognizes the object based on the appearance feature amount.

5. A method for recognizing a commodity by a commodity recognition apparatus having an image capturing section, a light source, a storage section and a display section, including:
    replacing data corresponding to a given pixel of an image with data indicating an image capturing condition of the image, to store in the storage section the image captured by the image capturing section which captures an object subject to recognition irradiated with a light from the light source;
    identifying, for each image that is stored in the storage section, the capturing condition of the light source for the image based on the data corresponding to the given pixel;
    selecting the image of the object captured by the image capturing section under a given image capturing condition identified;
    displaying the selected image on the display section; and
    recognizing, from the image stored in the storage section, the object imaged in the image as a specific commodity.

* * * * *